US010715049B2

(12) United States Patent
Asano

(10) Patent No.: US 10,715,049 B2
(45) Date of Patent: Jul. 14, 2020

(54) POWER SUPPLY APPARATUS AND IMAGE FORMING APPARATUS

(71) Applicant: CANON KABUSHIKI KAISHA, Tokyo (JP)

(72) Inventor: Hiroki Asano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/705,058

(22) Filed: Dec. 5, 2019

(65) Prior Publication Data

US 2020/0186044 A1 Jun. 11, 2020

(30) Foreign Application Priority Data

Dec. 11, 2018 (JP) .................................. 2018-231987

(51) Int. Cl.
| | |
|---|---|
| H02M 3/335 | (2006.01) |
| G03G 15/00 | (2006.01) |
| H02M 1/36 | (2007.01) |
| H02M 1/00 | (2006.01) |

(52) U.S. Cl.
CPC ........ *H02M 3/33569* (2013.01); *G03G 15/80* (2013.01); *H02M 1/36* (2013.01); *H02M 2001/0032* (2013.01)

(58) Field of Classification Search
CPC ........... H02M 1/36; H02M 2001/0025; H02M 2001/0032; G03G 15/80
See application file for complete search history.

(56) References Cited

U.S. PATENT DOCUMENTS

| | | | | |
|---|---|---|---|---|
| 6,061,252 A | * | 5/2000 | Hosotani | H02M 3/33569 363/134 |
| 8,503,197 B2 | | 8/2013 | Hayasaki | |
| 9,621,061 B2 | | 4/2017 | Hayasaki | |
| 9,897,964 B2 | * | 2/2018 | Shimura | G03G 15/80 |
| 10,566,907 B1 | * | 2/2020 | Hayasaki | G03G 15/80 |
| 2003/0142514 A1 | * | 7/2003 | Hosotani | H02M 3/3385 363/21.02 |
| 2008/0291702 A1 | * | 11/2008 | Hosotani | H02M 3/33569 363/21.02 |
| 2009/0289557 A1 | * | 11/2009 | Itoh | H05B 41/2882 315/127 |
| 2009/0316444 A1 | * | 12/2009 | Yamaguchi | H02M 3/3353 363/21.12 |
| 2010/0149840 A1 | * | 6/2010 | Hayasaki | H02M 3/3381 363/21.09 |
| 2010/0327776 A1 | * | 12/2010 | Yufuku | H05B 41/042 315/307 |

(Continued)

FOREIGN PATENT DOCUMENTS

JP 2010-142071 6/2010

*Primary Examiner* — Yusef A Ahmed
(74) *Attorney, Agent, or Firm* — Venable LLP

(57) ABSTRACT

The power supply apparatus includes a notification unit configured to notify, according to an input first signal, a control unit that a target voltage is switched from a first voltage to a second voltage higher than the first voltage; and a switching unit configured to switch the target voltage to the first voltage or the second voltage. The switching unit switches the target voltage from the first voltage to the second voltage after the notification unit notifies the control unit that the target voltage is switched from the first voltage to the second voltage.

6 Claims, 7 Drawing Sheets

(56) References Cited

U.S. PATENT DOCUMENTS

| | | | |
|---|---|---|---|
| 2012/0127760 A1* | 5/2012 | Hosono | H02M 3/33507 363/21.01 |
| 2012/0230063 A1* | 9/2012 | Okitsu | H02M 3/338 363/21.12 |
| 2013/0100496 A1* | 4/2013 | Kim | G06K 15/00 358/1.15 |
| 2013/0272031 A1* | 10/2013 | Hosotani | H02M 3/33569 363/16 |
| 2013/0307917 A1 | 11/2013 | Hayasaki | |
| 2014/0043869 A1* | 2/2014 | Hirabayashi | H02M 3/33507 363/21.16 |
| 2014/0099139 A1* | 4/2014 | Kojima | G03G 15/80 399/88 |
| 2014/0293659 A1* | 10/2014 | Kosaka | H02M 3/33546 363/21.09 |
| 2015/0016152 A1* | 1/2015 | Kojima | G03G 15/80 363/21.02 |
| 2016/0344296 A1* | 11/2016 | Luo | H02M 3/33523 |
| 2017/0005585 A1* | 1/2017 | Shimura | G03G 15/80 |
| 2017/0176918 A1* | 6/2017 | Shimura | G03G 15/80 |
| 2017/0176919 A1* | 6/2017 | Asano | H02M 3/33507 |
| 2018/0212508 A1* | 7/2018 | Kobayashi | G03G 15/16 |
| 2018/0316269 A1* | 11/2018 | Shimura | G03G 15/80 |
| 2019/0020268 A1* | 1/2019 | Saito | H02H 1/0007 |
| 2019/0058387 A1* | 2/2019 | Shimura | H02M 3/33569 |
| 2019/0058406 A1* | 2/2019 | Asano | H02M 1/36 |
| 2019/0098159 A1* | 3/2019 | Asano | H02M 3/33523 |
| 2019/0149054 A1* | 5/2019 | Shimura | H02M 3/33569 399/88 |
| 2019/0222112 A1* | 7/2019 | Sakai | G03G 15/80 |
| 2019/0260295 A1* | 8/2019 | Shimura | B41J 2/435 |

\* cited by examiner

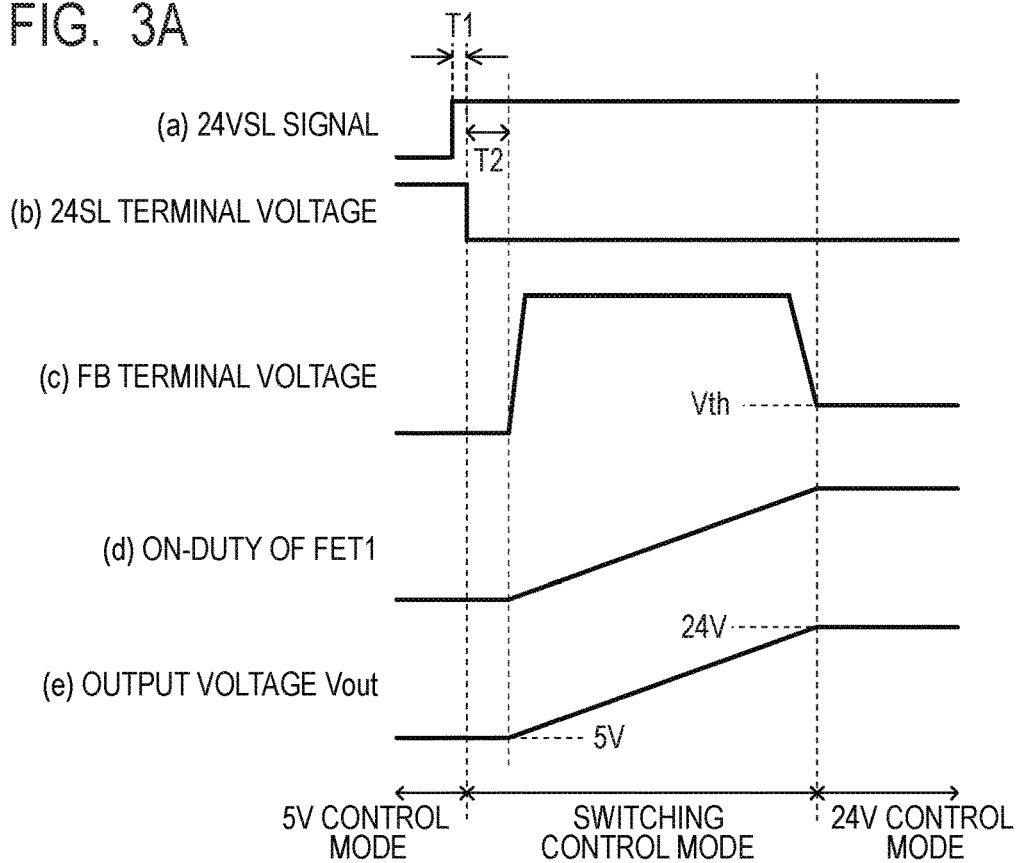
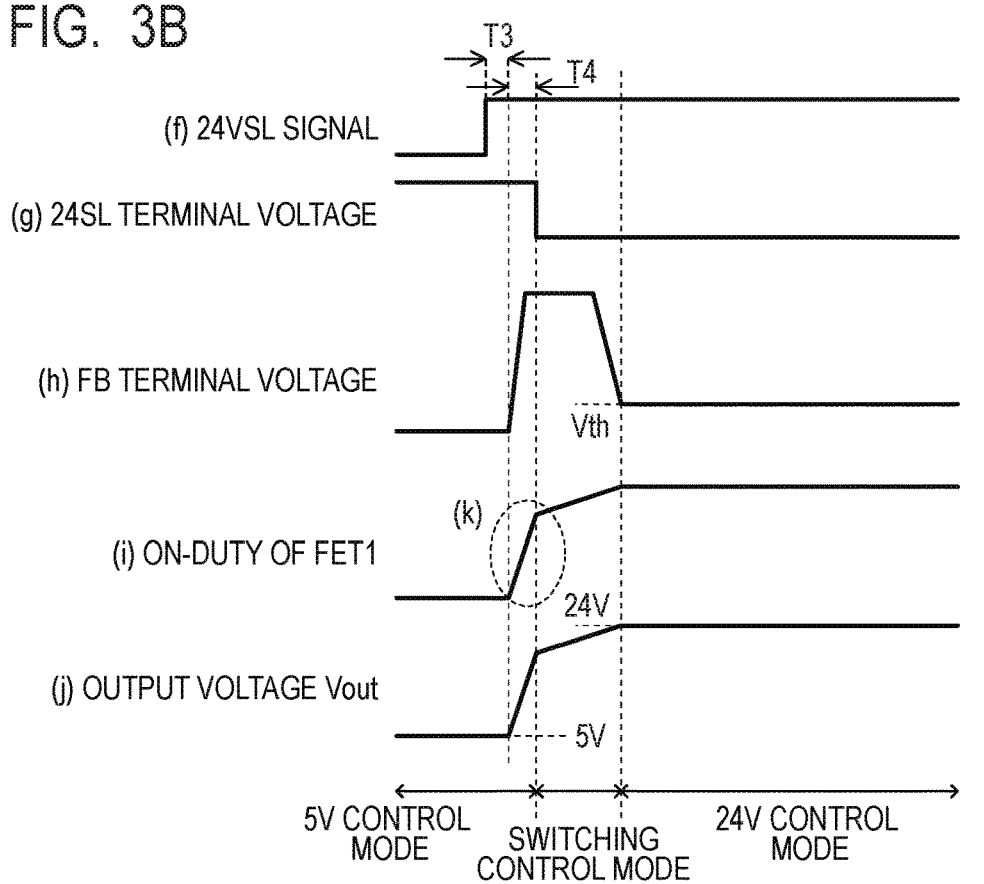

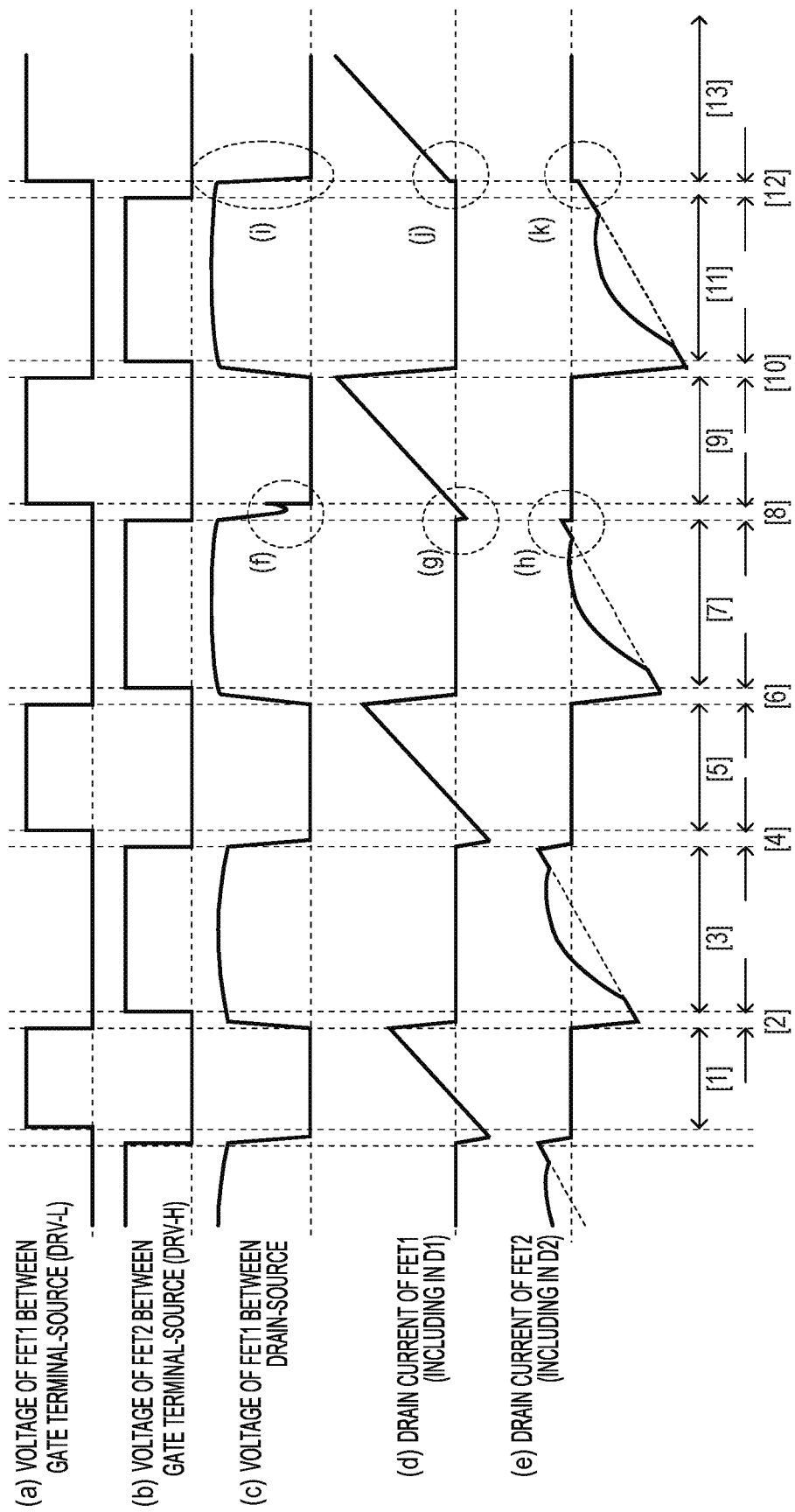

POWER SUPPLY APPARATUS AND IMAGE FORMING APPARATUS

BACKGROUND OF THE INVENTION

Field of the Invention

The present invention relates to power supply apparatuses and image forming apparatuses, and in particular relates to control for switching the output voltage of a switching power supply apparatus that includes a flyback-transformer-based insulating converter employing an active-clamp scheme.

Description of the Related Art

For switching power supplies that convert AC voltage of an AC power source such as a commercial power source into DC voltage, there has been a need to improve the efficiency of the switching power supplies in order to reduce their power consumption. The efficiency of a switching power supply here refers to the ratio of the power output by the switching power supply to the power supplied to the switching power supply. For example, as disclosed in Japanese Patent Application Laid-Open No. 2010-142071, an effective way to improve the efficiency of a switching power supply under light load is to reduce the output voltage of the switching power supply under light load.

Unfortunately, in an active-clamp switching power supply, sharply changing the output voltage of the switching power supply causes problems, such as overshoot or undershoot, and unnecessary current flowing into components due to inability to perform zero-voltage switching.

SUMMARY OF THE INVENTION

The present invention enables reducing unnecessary current flowing into components when the output voltage of a power supply apparatus is switched.

An aspect of embodiments of the present invention is a power supply apparatus including a transformer including a primary winding and a secondary winding, a first switching element connected in series with the primary winding of the transformer, a circuit connected in parallel with the primary winding of the transformer, the circuit including a second switching element and a capacitor connected in series with each other, a rectifying and smoothing unit configured to rectify and smooth a voltage induced in the secondary winding and output an output voltage, a feedback unit configured to output a feedback voltage according to the output voltage, a control unit configured to control the first switching element and the second switching element so that the output voltage becomes a target voltage based on the feedback voltage output from the feedback unit, a notification unit configured to notify that the target voltage is switched from a first voltage to a second voltage higher than the first voltage, to the control unit according to a first signal input, and a switching unit configured to switch the target voltage to the first voltage or the second voltage, wherein the switching unit switches the target voltage from the first voltage to the second voltage after the notification unit notifies the control unit that the target voltage is switched from the first voltage to the second voltage.

Another aspect of embodiments of the present invention is an image forming apparatus including an image forming unit configured to form an image on a recording material, and a power supply apparatus configured to supply power to the image forming apparatus, wherein the power supply apparatus includes a transformer including a primary winding and a secondary winding, a first switching element connected in series with the primary winding of the transformer, a circuit connected in parallel with the primary winding of the transformer, the circuit including a second switching element and a capacitor connected in series with each other, a rectifying and smoothing unit configured to rectify and smooth a voltage induced in the secondary winding and output an output voltage, a feedback unit configured to output a feedback voltage according to the output voltage, a control unit configured to control the first switching element and the second switching element such that the output voltage becomes a target voltage based on the feedback voltage output from the feedback unit, a notification unit configured to notify that the target voltage is switched from a first voltage to a second voltage higher than the first voltage, to the control unit according to a first signal input, and a switching unit configured to switch the target voltage to the first voltage or the second voltage, and wherein the switching unit switches the target voltage from the first voltage to the second voltage after the notification unit notifies the control unit that the target voltage is switched from the first voltage to the second voltage.

Further features of the present invention will become apparent from the following description of exemplary embodiments with reference to the attached drawings.

BRIEF DESCRIPTION OF THE DRAWINGS

FIGS. 3A and 3B are diagrams for describing the switching timing for an output voltage in the first embodiment.

FIG. 4 is a diagram for describing the operation of the power supply circuit in the absence of the control according to the first embodiment.

DESCRIPTION OF THE EMBODIMENTS

Preferred embodiments of the present invention will now be described in detail in accordance with the accompanying drawings.

With reference to the drawings, embodiments for implementing the present invention will be described in detail below by way of example.

First Embodiment

[Configuration of Power Supply Apparatus]

Figure 1:
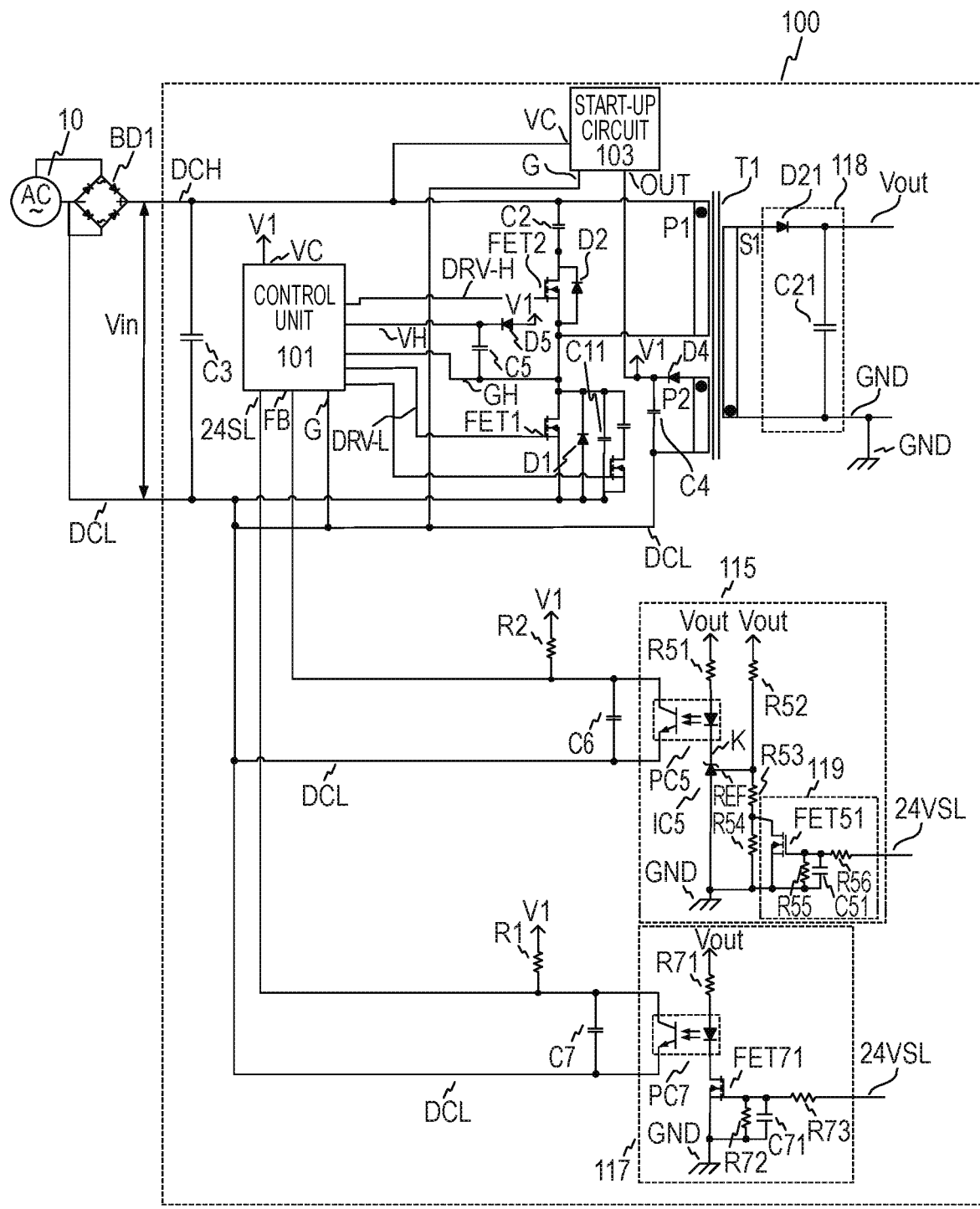
FIG. 1 is a schematic diagram of a power supply circuit in a first embodiment.

An active-clamp flyback power supply apparatus in a first embodiment will be described with reference to the drawings. FIG. 1 is a circuit diagram illustrating an overview of an active-clamp switching power supply circuit in the first embodiment. AC voltage is input from an AC power source 10 such as a commercial power source to a bridge diode BD1, which is a full-wave rectification unit, where the voltage is rectified. The voltage rectified by the bridge diode BD1 is input to a switching power supply circuit 100. In the switching power supply circuit 100, a smoothing capacitor C3 is used as a smoothing unit for the voltage rectified by the bridge diode BD1. DCL and DCH indicate the lower-potential side and the higher-potential side of the smoothing capacitor C3, respectively. The switching power supply circuit 100 takes an input voltage Vin accumulated in the smoothing capacitor C3 and outputs an output voltage Vout as a power supply voltage to the insulated secondary side of a transformer T1.

The switching power supply circuit 100 has the insulating transformer T1 that includes a primary winding P1 and an auxiliary winding P2 on the primary side, and a secondary winding S1 on the secondary side. Energy is supplied from the primary winding P1 to the secondary winding S1 of the transformer T1 with switching operations, which will be described below with regard to FIGS. 2A and 2B. The auxiliary winding P2 of the transformer T1 is used to supply a power supply voltage V1, which is created by a diode D4 and a capacitor C4 rectifying and smoothing a forward voltage of the input voltage Vin applied to the primary winding P1.

The primary side of the switching power supply circuit 100 has a field-effect transistor (hereinafter denoted as FET) 1, which is a first switching element, connected in series with the primary winding P1 of the transformer T1. A voltage-clamping capacitor C2 and an FET2, which is a second switching element, are connected in series with each other, and connected in parallel with the primary winding P1 of the transformer T1. The primary side of the switching power supply circuit 100 further has a control unit 101 that controls driving of the FET1 and the FET2.

The control unit 101 drives the FET1 by outputting a high-level control signal DRV-L and drives the FET2 by outputting a high-level control signal DRV-H. The power supply voltage V1 is supplied between a VC terminal and a G terminal of the control unit 101. For driving the FET2, the power supply voltage V1 is supplied between a VH terminal and a GH terminal of the control unit 101 by a charge pump circuit including a capacitor C5 and a diode D5.

A resonant capacitor C11 is connected in parallel with the FET1. Instead of providing the resonant capacitor C11, the capacitance between the drain terminal and the source terminal of the FET1 may be utilized. A diode D1 connected in parallel with the FET1 is a body diode of the FET1. Similarly, a diode D2 connected in parallel with the FET2 is a body diode of the FET2. The control unit 101 may be implemented by an IC including, e.g., an analog circuit, or by an operation control element (e.g., a CPU or an ASIC) operating according to a clock signal generated by a component such as an oscillator.

The secondary side of the switching power supply circuit 100 has a rectifying and smoothing circuit 118 that includes a diode D21 and a capacitor C21. The rectifying and smoothing circuit 118 is a secondary-side rectifying and smoothing unit for a flyback voltage occurring in the secondary winding S1 of the transformer T1. The voltage induced in the secondary winding S1 of the transformer T1 is rectified and smoothed by the diode D21 and the capacitor C21 and output as the output voltage Vout. The secondary side of the switching power supply circuit 100 also has a feedback unit 115. The feedback unit 115 feeds back to the primary side information (e.g., a feedback voltage) depending on the output voltage Vout output to the secondary side.

The feedback unit 115 is used to control the output voltage Vout to be a predetermined fixed voltage (hereinafter referred to as a target voltage). The voltage value of the output voltage Vout is set by a reference voltage that is input to a reference terminal REF of a shunt regulator IC5. That is, the output voltage Vout is set by voltage-dividing resistors R52, R53 and R54. If the output voltage Vout exceeds the target voltage, current flows from a cathode terminal K of the shunt regulator IC5, and the secondary-side diode of a photocoupler PC5 is brought into conduction via a pull-up resistor R51. This causes the primary-side phototransistor of the photocoupler PC5 to operate to discharge a capacitor C6. Therefore, the input voltage at an FB terminal of the control unit 101 (hereinafter referred to as an FB terminal voltage) decreases. By contrast, if the output voltage Vout falls below the target voltage, the secondary-side diode of the photocoupler PC5 is brought out of conduction. This causes the primary-side phototransistor of the photocoupler PC5 to be off, so that current flows to charge the capacitor C6 with the power supply voltage V1 via a resistor R2. Therefore, the FB terminal voltage increases. In this manner, the feedback unit 115 changes the FB terminal voltage for the control unit 101 according to the variation in the output voltage Vout.

By detecting the FB terminal voltage input from the feedback unit 115, the control unit 101 performs feedback control for controlling the output voltage Vout to be the target voltage. The control unit 101 can thus indirectly perform feedback control of the output voltage Vout by monitoring the FB terminal voltage. Because the control unit 101 can know the load state by monitoring the FB terminal voltage, the control unit 101 can perform appropriate control according to the load state. To more accurately determine the load state, a current detection unit may be provided at the FET1 or in the path of the power to be supplied to the loads for the switching power supply circuit 100.

A target voltage switching unit 119 has the function of switching the target voltage of the output voltage Vout. The target voltage switching unit 119 has: an FET51 connected in parallel with a voltage-dividing resistor R54; a resistor R55 and a capacitor C51 connected between the gate terminal and the source terminal of the FET51; and a resistor R56 connected to the gate terminal of the FET51. The gate terminal of the FET51 is connected to an input 24VSL signal, which is a first signal, via the resistor R56. The first signal is typically input externally. The 24VSL signal is output from, for example, a control unit in the apparatus (e.g., an image forming apparatus) in which the switching power supply circuit 100 resides.

If the 24VSL signal is at high level, the FET51 is turned on and the voltage-dividing resistor R54 is short-circuited. The voltage input to the REF terminal of the shunt regulator IC5 therefore becomes the output voltage Vout divided by the voltage-dividing resistors R52 and R53. As a result, the voltage division ratio of the reference voltage of the shunt regulator IC5 to the output voltage Vout decreases, and the feedback unit 115 operates to cause DC 24 V, which is a second voltage, to be output as the output voltage Vout. By contrast, if the 24VSL signal is at low level, the FET51 is turned off and the voltage-dividing resistors R53 and R54 are connected in series with each other. The voltage input to the REF terminal of the shunt regulator IC5 therefore becomes the output voltage Vout divided by the voltage-dividing resistors R52, R53 and R54. As a result, the voltage division ratio of the reference voltage of the shunt regulator IC5 to the output voltage Vout increases, and the feedback unit 115 operates to cause DC 5 V, which is a first voltage, to be output as the output voltage Vout. In this manner, the target voltage switching unit 119 switches the target voltage of the output voltage Vout to 24 V if the 24VSL signal is at high level, and to 5 V if the 24VSL signal is at low level.

Here, the resistor R56, which is a second resistor, and the capacitor C51, which is a second capacitor, serve as a low-pass filter for the 24VSL signal. When the 24VSL signal switches from low level to high level, the timing with which the FET51 is turned on is delayed by the amount of time corresponding to the constant of the resistor R56 and the capacitor C51. Conversely, when the 24VSL signal switches from high level to low level, the timing with which the FET51 is turned off is delayed.

A target voltage notification unit 117 has the function of notifying the control unit 101 of the target voltage of the output voltage Vout according to the state of the 24VSL signal. The target voltage notification unit 117 has an FET71, and a resistor R72 and a capacitor C71 connected between the gate terminal and the source terminal of the FET71. The target voltage notification unit 117 also has a resistor R73 connected to the gate terminal of the FET71, and a photocoupler PC7 and a resistor R71 connected to the drain terminal of the FET71. The 24VSL signal is connected to the gate terminal of the FET71 via the resistor R73. The resistor R73, which is a first resistor, and the capacitor C71, which is a first capacitor, serve as a low-pass filter for the 24VSL signal.

If the 24VSL signal is at high level, the FET71 is turned on and current flows to the secondary-side diode of the photocoupler PC7 via the resistor R71. As a result, the primary-side phototransistor of the photocoupler PC7 is turned on to discharge the capacitor C7. The input voltage at a 24SL terminal of the control unit 101 (hereinafter referred to as a 24SL terminal voltage) then goes to low level. By contrast, if the 24VSL signal is at low level, the FET71 is turned off and the secondary-side diode of the photocoupler PC7 is brought out of conduction and passes no current. As a result, the primary-side phototransistor of the photocoupler PC7 is turned off to charge the capacitor C7 with the power supply voltage V1 via the resistor R1. The 24SL terminal voltage then goes to high level.

In this manner, if the 24VSL signal is at high level and therefore the target voltage is 24 V, the 24SL terminal voltage at the control unit 101 goes to low level. If the 24VSL signal is at low level and therefore the target voltage is 5 V, the 24SL terminal voltage at the control unit 101 goes to high level. The control unit 101 thus detects whether the target voltage is DC 24 V or DC 5 V according to the 24SL terminal voltage. When the 24SL terminal voltage is at high level, the control unit 101 controls the ON-time (hereinafter also referred to as the ON-duty) of the FET1 and FET2 such that the output voltage Vout becomes 5 V. The state involving this control will hereinafter be referred to as 5 V control mode. When the 24SL terminal voltage is at low level, the control unit 101 controls the ON-time of the FET1 and FET2 such that the output voltage Vout becomes 24 V. The state involving this control will hereinafter be referred to as 24 V control mode. The state in which the control unit 101 is performing control in the process of switching the target voltage of the output voltage Vout from 5 V to 24 V will hereinafter be referred to as switching control mode, which will be described in detail below.

Thus, the 24VSL signal in the first embodiment is connected to both the target voltage switching unit 119 and the target voltage notification unit 117. When the level of the 24VSL signal is switched, the target voltage notification unit 117 notifies the control unit 101 of the switching of the target voltage, and after a predetermined time elapses, the target voltage switching unit 119 switches the target voltage of the output voltage Vout. This predetermined time is determined by the difference between the time constant (a second time constant) of the resistor R56 and the capacitor C51 and the time constant (a first time constant) of the resistor R73 and the capacitor C71. The signal input to the target voltage switching unit 119 and the target voltage notification unit 117 may be separate signals. That is, a first signal may be input to the target voltage switching unit 119, and a signal different from the first signal may be input to the target voltage notification unit 117.

A start-up circuit 103, which may be a three-terminal regulator or a step-down switching power supply circuit, converts the input voltage Vin input between a VC terminal and a G terminal and outputs the power supply voltage V1 from an OUT terminal. The start-up circuit 103 operates only if the power supply voltage V1 supplied from the auxiliary winding P2 falls to or below a predetermined voltage value, and is used to supply the power supply voltage V1 upon start-up of the switching power supply circuit 100.

[Method of Controlling Switching Power Supply Circuit]

Figure 2A:
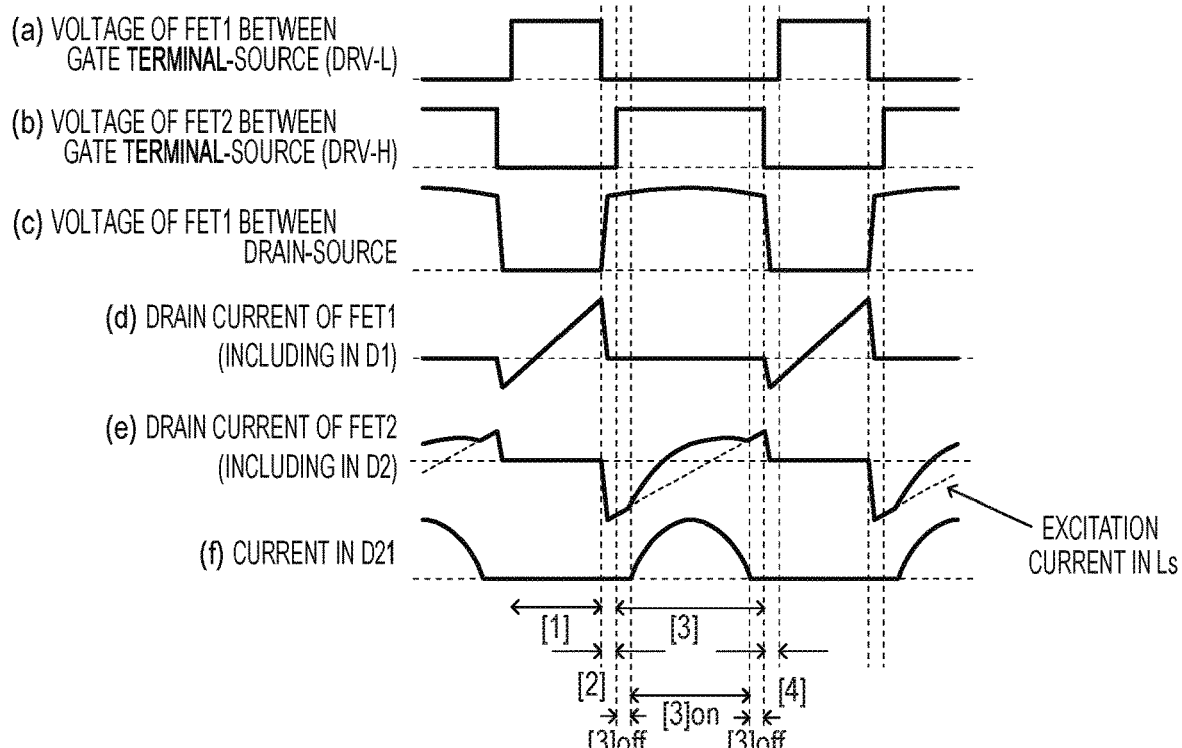
FIG. 2A is a timing chart for describing control methods in the first embodiment and a second embodiment.
Figure 2B:
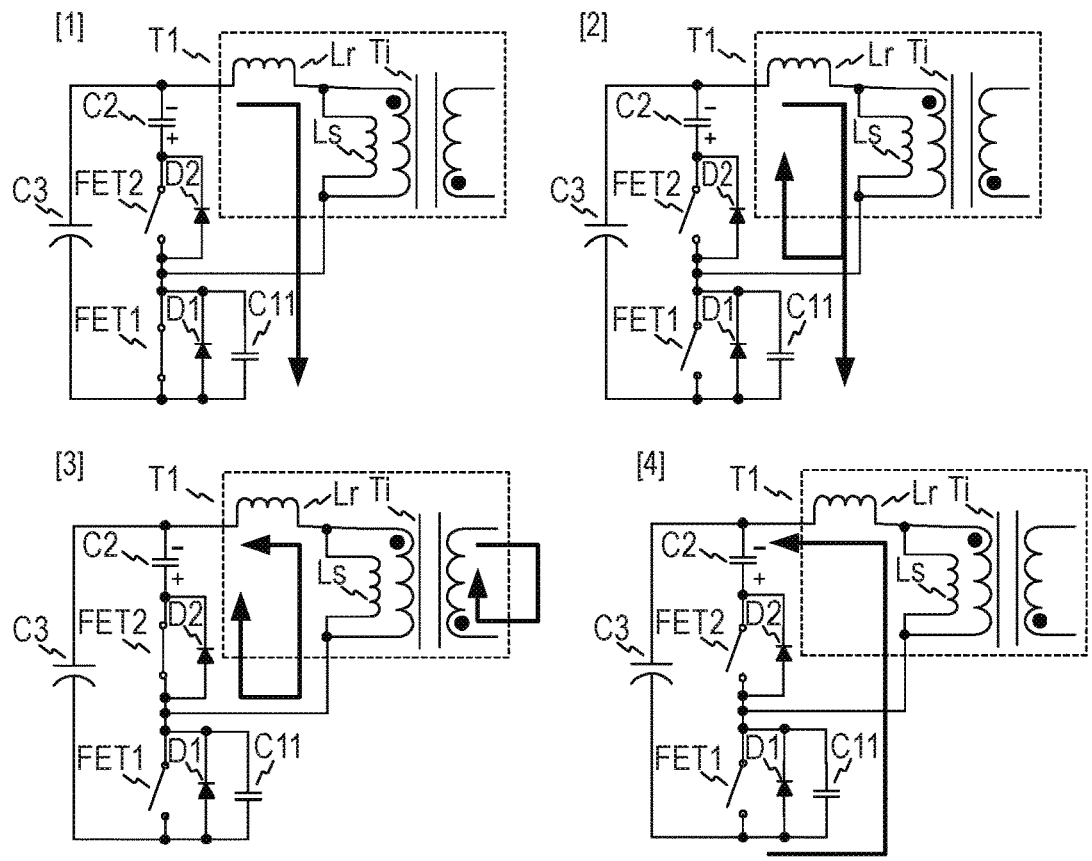
FIG. 2B is a diagram illustrating current flows in respective periods [1] to [4] regarding the control methods in the first and second embodiments as simplified circuit diagrams.

FIGS. 2A and 2B are diagrams for describing a method for the control unit 101 to control the active-clamp switching power supply circuit 100. In the switching power supply circuit 100, power is supplied to the secondary side by the control unit 101 alternately turning on and off the FET1 and the FET2 with intervening dead times, in which both the FET1 and FET2 are OFF. FIG. 2A is a diagram illustrating voltage waveforms and current waveforms of the terminals of the FET1 and FET2 for the periods [1] to [4] to be described later. In FIG. 2A, FIG. 2A (a) illustrates the voltage between the gate terminal and the source terminal of the FET1, indicating the state of the control signal DRV-L, which is the input signal to the gate terminal of the FET1. FIG. 2A (b) illustrates the voltage between the gate terminal and the source terminal of the FET2, indicating the state of the control signal DRV-H, which is the input signal to the gate terminal of the FET2. FIG. 2A (c) illustrates the voltage between the drain terminal and the source terminal of the FET1. FIG. 2A (d) illustrates the drain current of the FET1, including the current flowing into the diode D1. FIG. 2A (e) illustrates the drain current of the FET2, including the current flowing into the diode D2. Excitation current flowing through an excitation inductance Ls is shown in FIG. 2A (e) by a dashed line. FIG. 2A (0 illustrates the waveform of the current flowing to the diode D21 on the secondary side of the transformer T1. The abscissa in each figure indicates time.

FIG. 2B is a diagram illustrating the current flows in the respective periods [1] to [4] as simplified circuit diagrams. The transformer T1 is shown as being divided into a leakage inductance Lr, an excitation inductance Ls, and an ideal transformer T1. In the circuits in FIG. 2B, the current flowing in each period is represented as a thick solid-line arrow.

In the period [1], the FET1 is ON and the FET2 is OFF (FIG. 2A (a) and (b)). The current flows from the smoothing capacitor C3 into the primary winding P1 of the transformer T1, so that energy is accumulated in the leakage inductance Lr and the excitation inductance Ls of the transformer T1. In this period, the voltage between the drain terminal and the source terminal of the FET1 is substantially zero (FIG. 2A (c)), and the drain current flowing into the FET1 linearly increases (FIG. 2A (d)).

The next period [2] is a dead time period, in which the FET1 and the FET2 are both OFF (FIG. 2A (a) and (b)). When the FET1 is turned off, the current that has been flowing into the primary winding P1 of the transformer T1 now flows to charge the resonant capacitor C11. As the resonant capacitor C11 is charged, the voltage between the drain terminal and the source terminal of the FET1 increases (FIG. 2A (c)). Once the voltage between the drain terminal and the source terminal of the FET1 exceeds the voltage at the +terminal of the voltage-clamping capacitor C2, the current that has been flowing into the primary winding P1 of the transformer T1 begins to flow to charge the voltage-clamping capacitor C2 via the diode D2. This allows kickback voltage caused by the leakage inductance Lr to be absorbed by the voltage-clamping capacitor C2. Therefore, surge voltage applied between the drain terminal and the source terminal of the FET1 can be prevented. In addition, because the voltage between the drain terminal and the source terminal of the FET2 becomes substantially zero, transitioning to the period [3] to turn on the FET2 in this state can realize zero-voltage switching of the FET2.

Here, the length of the period [2] may be set to be substantially the same as or slightly longer than the time period from turning off the FET1 to reaching substantially zero voltage between the drain terminal and the source terminal of the FET2. Longer periods [2] will cause the current to flow to the diode D2 for a longer period, resulting in correspondingly wasteful power consumption. Shorter periods [2] will cause the FET2 to be turned on before the voltage between the drain terminal and the source terminal of the FET2 becomes zero, resulting in failure of zero-voltage switching and again wasteful power consumption. Setting the length of the period [2] to be an appropriate value can reduce power consumption.

In the next period [3], the FET2 is ON and the FET1 is OFF (FIG. 2A (a) and (b)). When the FET2 is turned on, the current that has been charging the voltage-clamping capacitor C2 via the diode D2 begins to flow through the FET2. As the voltage in the voltage-clamping capacitor C2 increases, the diode D21 on the secondary side is turned on and power is supplied to the secondary side of the switching power supply circuit 100 via the secondary winding S1 of the transformer T1.

Here, the dashed-line waveform in the drain current of the FET2 shown in FIG. 2A (e) indicates the excitation current flowing through the excitation inductance Ls of the transformer T1, and it linearly changes. The sum of this excitation current flowing through the excitation inductance Ls and the current flowing through the ideal transformer T1 is the drain current of the FET2. The current flowing through the ideal transformer T1 is similar in shape to the current flowing into the diode D21 (FIG. 2A (f)).

The period [3] includes periods in which no power is supplied to the secondary side (hereinafter referred to as periods [3]off) and a period in which power is supplied to the secondary side (hereinafter referred to as a period [3]on). In the periods [3]off, current flows into the FET2 mainly due to resonance operation between the voltage-clamping capacitor C2 and the leakage inductance Lr and excitation inductance Ls of the transformer T1. By contrast, in the period [3]on, current flows into the FET2 mainly due to resonance operation between the voltage-clamping capacitor C2 and the leakage inductance Lr of the transformer T1. The inductance value of the leakage inductance Lr is smaller than the inductance value of the excitation inductance Ls (Lr<Ls). Therefore, the resonance frequency (denoted as Fon) in the period [3]on is higher than the resonance frequency (denoted as Foff) in the periods [3]off (Fon>Foff).

The excitation current flowing through the excitation inductance Ls of the transformer T1 becoming zero means that all the energy accumulated in the excitation inductance Ls has been released. Keeping the FET2 ON thereafter causes the current to begin to reversely flow from the voltage-clamping capacitor C2 toward the excitation inductance Ls, so that reverse-phase energy is accumulated in the excitation inductance Ls.

The next period [4] is again a dead-time period, in which the FET1 and the FET2 are both OFF. When the FET2 is turned off, the current that has been flowing into the primary winding P1 of the transformer T1 now flows to discharge the resonant capacitor C11. As the resonant capacitor C11 is discharged, the voltage between the drain terminal and the source terminal of the FET1 decreases (FIG. 2A (c)). Once the voltage between the drain terminal and the source terminal of the FET1 falls below zero, the current that has been flowing into the primary winding P1 of the transformer T1 is regenerated for the smoothing capacitor C3 via the diode D1. Returning to the period [1] to turn on the FET1 in this state can realize zero-voltage switching of the FET1. As in the above-described period [2], power consumption can be reduced by setting the length of the period [4] to be substantially the same as or slightly longer than the time period from turning off the FET2 to reaching substantially zero voltage between the drain terminal and the source terminal of the FET1.

As described above, the active-clamp flyback power supply apparatus, which is a switching power supply in the first embodiment, repeats the control in the periods [1] to [4]. This allows supplying power to the secondary side with zero-voltage switching of the FET1 and the FET2 while preventing surge voltage caused by the leakage inductance Lr.

The above-described switching power supply circuit 100 is operating in continuous operation mode in which the periods [1] to [4] are repeated. In a typical switching power supply circuit, intermittent operation mode is employed. Intermittent operation mode includes switching periods in which the FET1 and the FET2 alternately perform the switching operations, and switching halt periods in which the FET1 and the FET2 both halt the switching operations. A switching power supply circuit operating in intermittent operation mode can achieve a higher power-conversion efficiency than in continuous operation mode. However, because ripple occurs in the output voltage Vout in intermittent operation mode, intermittent operation mode is usually employed only when the output power is low. This intermittent operation mode may be employed in the active-clamp flyback power supply apparatus in the first embodiment to improve the power conversion efficiency. For example, the switching power supply circuit 100 may be controlled to operate in continuous operation mode when the output power is high, and to operate in intermittent operation mode when the output power is low.

[Switching Timing for Target Voltage]
(With the Control in the First Embodiment)

The timing in switching the target voltage of the output voltage Vout will now be described with reference to FIGS. 3A and 3B. FIG. 3A is a diagram for describing the switching timing in the first embodiment, in which the target voltage of the output voltage Vout is switched after the control unit 101 is notified of the target-voltage switching. By contrast, FIG. 3B is a diagram for describing the case where the control unit 101 is notified of the target-voltage switching after the target voltage of the output voltage Vout is switched. In FIGS. 3A and 3B, FIG. 3A (a) and FIG. 3B (0 illustrate the waveforms of the 24VSL signal; FIG. 3A (b) and FIG. 3B (g) illustrate the waveforms of the 24SL terminal voltage; FIG. 3A (c) and FIG. 3B (h) illustrate the waveforms of the FB terminal voltage; FIG. 3A (d) and FIG. 3B (i) illustrate the ON-duty of the FET1; and FIG. 3A (e) and FIG. 3B (j) illustrate the output voltage Vout, below which the control mode of the control unit 101 is indicated. The abscissa in each diagram indicates time.

In FIG. 3A, the input 24VSL signal is first switched from low level to high level. After a first time T1 elapses, the 24SL terminal voltage changes from high level to low level. The first time T1 is determined by the time constant of the resistor R73 and the capacitor C71 of the target voltage notification unit 117. The control unit 101 thus detects that the target voltage of the output voltage Vout is switched from 5 V to 24 V, and transitions from 5 V control mode to switching control mode.

Switching control mode here involves control performed after the target voltage of the output voltage Vout is switched and until the output voltage Vout reaches the target voltage. Specifically, in switching control mode, open-loop control is performed in which the ON-duty of the FET1 is gradually increased as long as the FB terminal voltage is above a predetermined value. The predetermined value will hereinafter be referred to as a predetermined value Vth (a predetermined voltage). Gradually increasing the ON-duty of the FET1 allows the output voltage Vout to be switched while maintaining zero-voltage switching of the FET1 and the FET2.

A second time T2 after the transition from 5 V control mode to switching control mode, the FB terminal voltage begins to increase (FIG. 3A (c)). The second time T2 is determined by the difference between the time constant of the resistor R56 and the capacitor C51 of the target voltage switching unit 119 and the time constant of the resistor R73 and the capacitor C71 of the target voltage notification unit 117. Because the control unit 101 is now in switching control mode, the ON-duty of the FET1 is controlled to gradually increase. Accordingly, the output voltage Vout also gradually increases (FIG. 3A (e)). Once the output voltage Vout increases to near the target voltage 24 V, the FB terminal voltage begins to decrease. When the FB terminal voltage decreases to the predetermined value Vth, the control unit 101 determines that the output voltage Vout has reached the target voltage 24 V and transitions from switching control mode to 24 V control mode. Thus, the time constant of the resistor R73 and the capacitor C71 is set to be a sufficiently small value relative to the time constant of the resistor R56 and the capacitor C51. This allows stable switching of the output voltage Vout, because the target voltage of the output voltage Vout is switched after the control unit 101 is notified of the target-voltage switching.

(With the Reverse Control to the Control in the First Embodiment)

Conversely, consider the case where the time constant of the resistor R73 and the capacitor C71 is set to be larger than the time constant of the resistor R56 and the capacitor C51. This results in the operation as in FIG. 3B, which will be described below. When the input 24VSL signal is switched from low level to high level, the FB terminal voltage begins to increase after a third time elapses. The third time is determined by the time constant of the resistor R56 and the capacitor C51 of the target voltage switching unit 119. Because the control unit 101 at this point is in 5 V control mode, the ON-duty of the FET1 is controlled to sharply increase with the increase of the FB terminal voltage (FIG. 3B (k)). Accordingly, the output voltage Vout sharply increases (FIG. 3B (j)). The sharp increase of the ON-duty of the FET1 causes a shortage of energy necessary for zero-voltage switching of the FET1. Consequently, a large radiation noise is produced to increase the risk of malfunction, as well as components are subjected to stress, leading to shorter lives of the components. This situation should be avoided as much as possible.

A fourth time T4 after the FB terminal voltage begins to increase, the 24SL terminal voltage goes to low level. The fourth time T4 is determined by the difference between the time constant of the resistor R73 and the capacitor C71 of the target voltage notification unit 117 and the time constant of the resistor R56 and the capacitor C51 of the target voltage switching unit 119. The control unit 101 then detects that the 24SL terminal voltage has changed from high level to low level, and finally transitions from 5 V control mode to switching control mode to control the ON-duty of the FET1 to be gradually increased.

Once the output voltage Vout increases near the target voltage 24 V, the FB terminal voltage begins to decrease. When the FB terminal voltage decreases to the predetermined value Vth, the control unit 101 determines that the output voltage Vout has reached the target voltage 24 V, and transitions from switching control mode to 24 V control mode. Thus, if the time constant of the resistor R73 and the capacitor C71 is larger than the time constant of the resistor R56 and the capacitor C51, the control unit 101 is notified of the target-voltage switching after the target voltage of the output voltage Vout is switched. Zero-voltage switching then cannot be performed, which poses various problems.

[Circuit Operation Hindering Zero-Voltage Switching]

Circuit operation seen when the ON-duty of the FET1 is sharply increased will be described with reference to FIG. 4. FIG. 4 (a) to (e) are figures similar to FIG. 2A (a) to (e). The periods [1] to [4] are as described with regard to FIGS. 2A and 2B. The period [5] is similar to the period [1] in that the FET1 is ON and the FET2 is OFF, but is longer than the period [1]. That is, the ON-time of the FET1 is longer in the period [5] than in the period [1]. The drain current of the FET1 immediately before the end of the period [5] is correspondingly larger (FIG. 4 (d)). The energy accumulated in the transformer T1 is also larger.

The period [6] is a dead-time period as in the period [2], but the drain currents of the FET1 and the FET2 are larger than in the period [2]. This is because the period [6] has more energy accumulated in the transformer T1 than the period [2]. The period [7] is similar to the period [3] in that the FET2 is ON and the FET1 is OFF, and has the same length as the period [3]. The period [7] requires, however, a longer time to release the energy accumulated in the transformer T1 than the period [3]. Accordingly, fewer reverse-phase energy is accumulated in the transformer T1 in the period [7] than in the period [3] (FIG. 4 (h)). Because this energy is used to discharge the resonant capacitor C11 of the FET1 when the FET2 is turned off to transition to the period [8], a shortage of this energy prevents the drain-source voltage of the FET1 from becoming zero (FIG. 4 (f)). The FET1 then cannot undergo zero-voltage switching. The period [8] is a dead time as in the period [4].

In the period [9], the FET1 is ON and the FET2 is OFF as in the period [5]. However, because the reverse-phase energy accumulated in the transformer T1 in the beginning of the period [9] is substantially zero, the drain current of the FET1 in the beginning of the period [9] is also substantially zero (FIG. 4 (g)). The period [9] has the same length as the period [5], so that more energy is accumulated in the transformer T1 in the period [9] than in the period [5] (FIG. 4 (d)).

The period [10] is a dead time as in the period [6]. The period [11] is similar to the period [7] in that the FET2 is ON and the FET1 is OFF, and has the same length as the period [7]. In the period [11], not all the energy accumulated in the transformer T1 can be released, so that no reverse-phase energy can be accumulated (FIG. 4 (*k*)). Therefore, the drain-source voltage of the FET1 can never be reduced in the dead time of the period [12] (FIG. 4 (*i*)). In this state, turning on the FET1 to transition to the period [13] immediately causes the drain current of the FET1 to flow by the amount of energy accumulated in the transformer T1 (FIG. 4 (*j*)). This is a state in which excitation current is always flowing into the transformer T1, i.e., the continuous current state. Thus, causing the duty of the FET1 to sharply increase, or in other words, setting the time constant of the resistor R73 and the capacitor C71 to be larger than the time constant of the resistor R56 and the capacitor CM as in FIG. 3B, hinders zero-voltage switching.

As described above, in the first embodiment, the delay times of the circuit operation of the target voltage switching unit 119 and the target voltage notification unit 117 with respect to the 24VSL signal are appropriately set as in FIG. 3A. Specifically, the time constant of the resistor R73 and the capacitor C71 is set to be a sufficiently small value relative to the time constant of the resistor R56 and the capacitor CM. This allows maintaining zero-voltage switching to stably switch the output voltage Vout without subjecting components to stress.

Thus, according to the first embodiment, unnecessary current flowing into components can be reduced when the output voltage of the power supply apparatus is switched.

Second Embodiment

[Configuration of Power Supply Apparatus]

Figure 5:
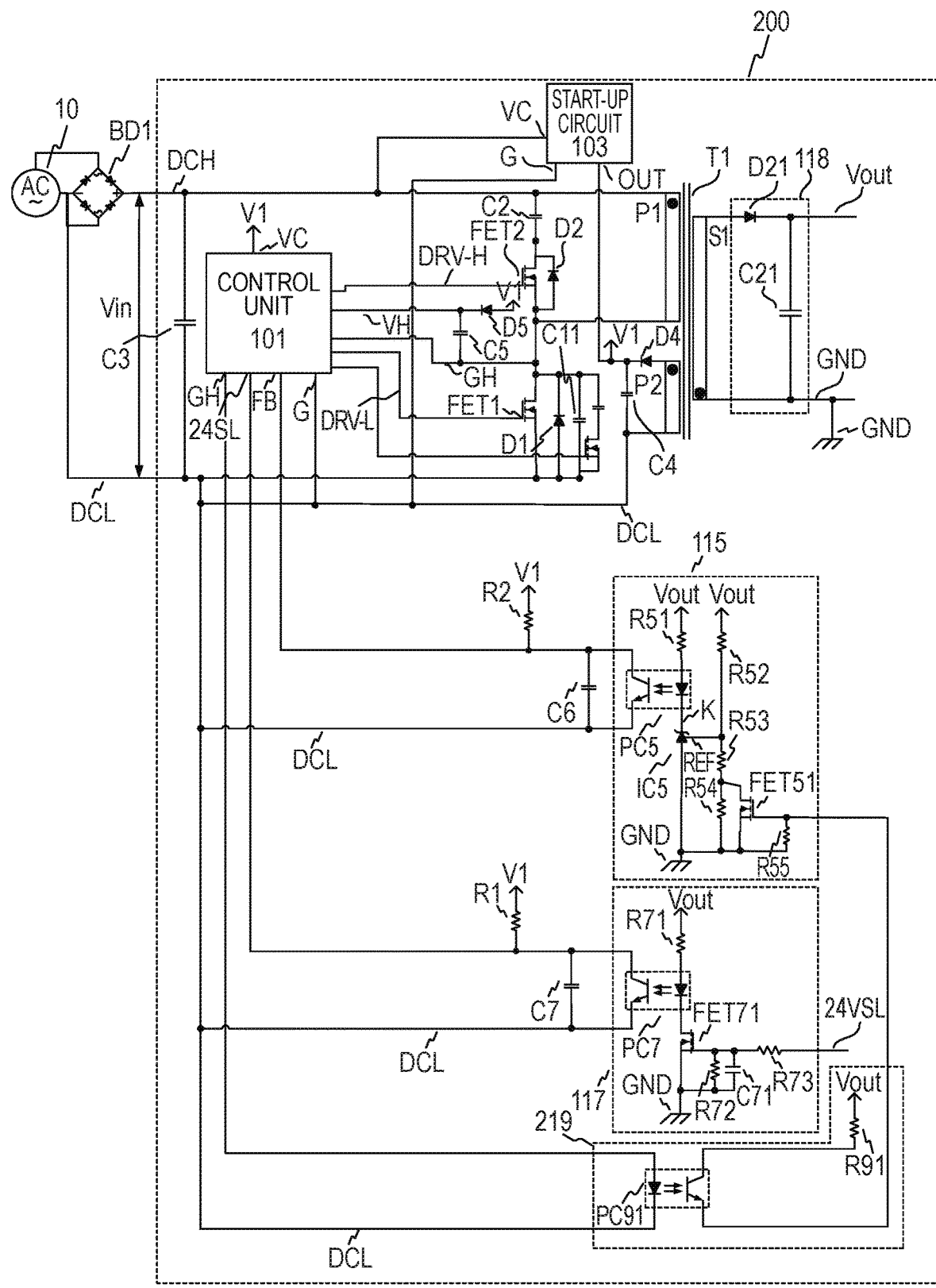
FIG. 5 is a schematic diagram of a power supply circuit in the second embodiment.

A second embodiment will be described. Only what is different from the first embodiment will be described; otherwise, description will be omitted. FIG. 5 is a circuit diagram illustrating an overview of an active-clamp switching power supply circuit 200 in the second embodiment. FIG. 5 is different from FIG. 1 in that a primary-side target voltage switching unit 219 replaces the target voltage switching unit 119. The primary-side target voltage switching unit 219 includes a photocoupler PC91 and a resistor R91. The anode terminal of the photocoupler PC91 is connected to a CH terminal, which is an output terminal of the control unit 101, while the cathode terminal of the photocoupler PC91 is connected to DCL. The collector terminal of the secondary-side phototransistor of the photocoupler PC91 is connected to the output voltage Vout via the resistor R91, while the emitter terminal of the secondary-side phototransistor is connected to the gate terminal of the FET51 of the feedback unit 115. The same components as in FIG. 1 are labeled with the same symbols and will not be described.

[Control in Switching from 5 V to 24 V]

Figure 6:
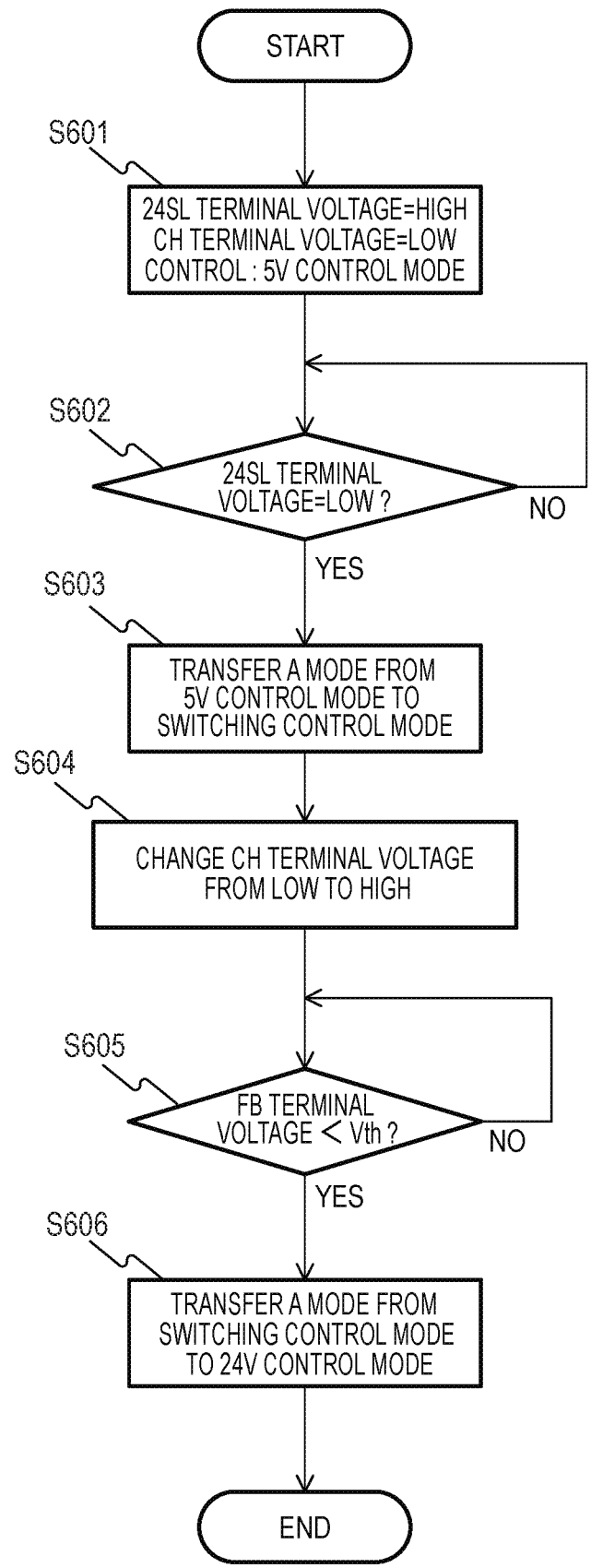
FIG. 6 is a flowchart for describing switching control of the output voltage in the second embodiment.

The flow of control performed by the control unit 101 in switching the target voltage of the output voltage Vout from 5 V to 24 V will be described with reference to FIG. 6. At step (hereinafter denoted as S) 601, where a high-level voltage (High) is input as the 24SL terminal voltage and a low-level voltage (Low) is input as the voltage at the CH terminal (hereinafter referred to as a CH terminal voltage), the control unit 101 is operating in 5 V control mode. The CH terminal voltage corresponds to a second signal. At S602, the control unit 101 determines whether the 24SL terminal voltage is detected being at low level (Low). If it is determined at S602 that the 24SL terminal voltage is not at low level, the control unit 101 returns the process to S602. If it is determined that the 24SL terminal voltage is at low level, the control unit 101 advances the process to S603.

At S603, the control unit 101 transitions from 5 V control mode to switching control mode. At S604, the control unit 101 changes the CH terminal voltage from low level to high level. In switching control mode, the control unit 101 controls the ON-duty of the FET1 to be gradually increased irrespective of the FB terminal voltage. At S605, the control unit 101 determines whether the FB terminal voltage is lower than the predetermined value Vth. If it is determined at S605 that the FB terminal voltage is not lower than the predetermined value Vth, the control unit 101 returns the process to S605. If it is determined at S605 that the FB terminal voltage is lower than the predetermined value Vth, the control unit 101 determines that the output voltage Vout reaches 24 V, and advances the process to S606.

At S606, the control unit 101 transitions from switching control mode to 24 V control mode and terminates the process. Controlling in the above manner eliminates the need to consider the delay times of the circuit operation of the target voltage switching unit 119 and the target voltage notification unit 117. The above control allows maintaining zero-voltage switching to stably switch the output voltage Vout without subjecting components to stress.

Thus, according to the second embodiment, unnecessary current flowing into components can be reduced when the output voltage of the power supply apparatus is switched.

Third Embodiment

[Image Forming Apparatus]

Figure 7:
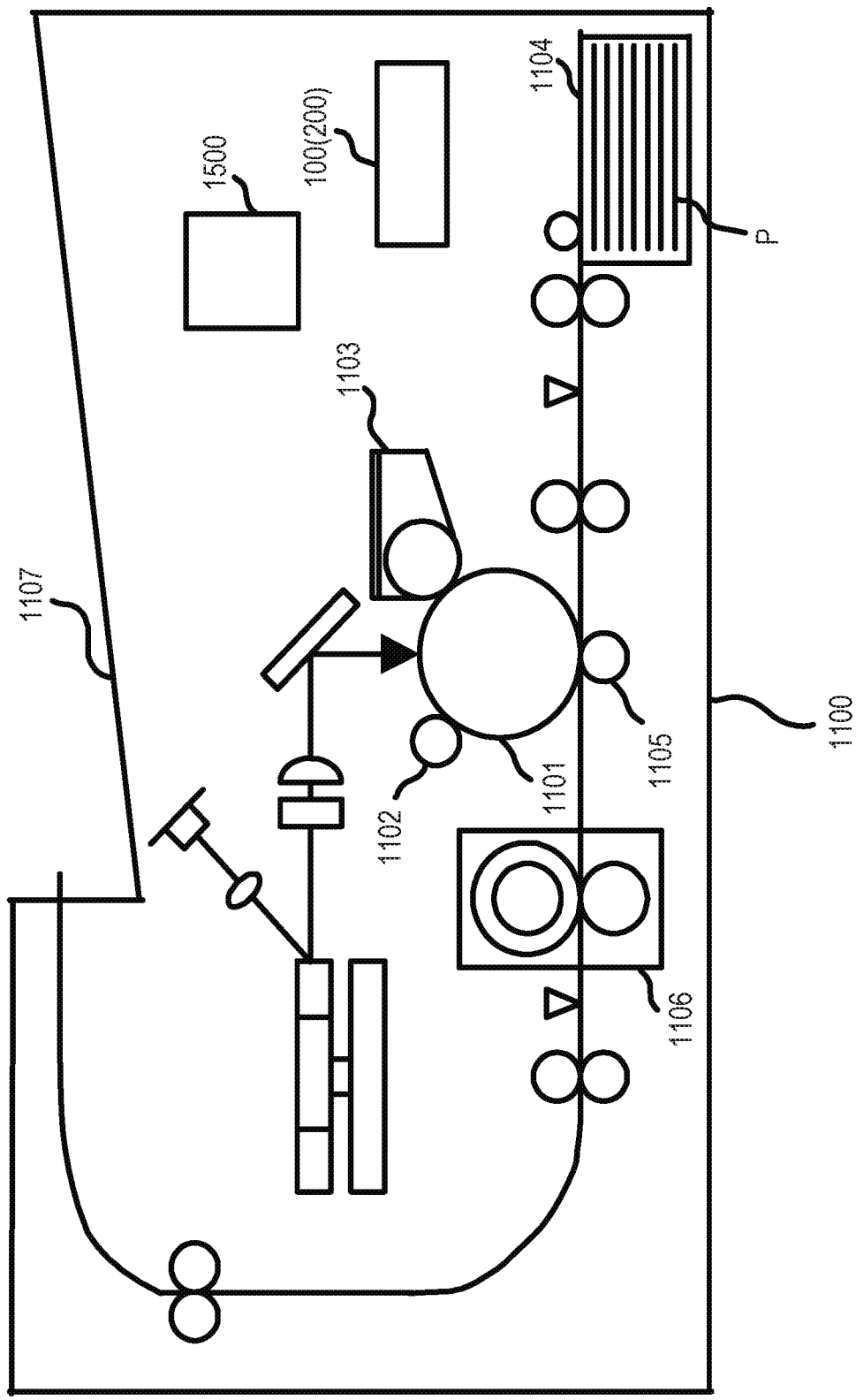
FIG. 7 is a diagram illustrating an image forming apparatus in a third embodiment.

FIG. 7 illustrates a schematic configuration of a laser beam printer as an exemplary image forming apparatus. The laser beam printer 1100 (hereinafter referred to as a printer 1100) includes a photoconductive drum 1101, a charge unit 1102 and a development unit 1103. The photoconductive drum 1101 is an image carrier on which an electrostatic latent image is formed. The charge unit 1102 uniformly charges the photoconductive drum 1101. The development unit 1103 applies toner to the electrostatic latent image formed on the photoconductive drum 1101 and develops the electrostatic latent image, thereby forming a toner image. The toner image formed on the photoconductive drum 1101 (the image carrier) is transferred by a transfer unit 1105 onto a sheet P, which is a recording material, supplied from a cassette 1104. The unfixed toner image transferred on the sheet P is fixed by a fixing device 1106, and the sheet P is ejected into a tray 1107. The photoconductive drum 1101, the charge unit 1102, the development unit 1103, and the transfer unit 1105 constitute an image forming unit. The printer 1100 also includes the switching power supply circuit 100 in the first embodiment or the switching power supply circuit 200 in the second embodiment. The switching power supply circuit 100 or 200 supplies power to driving units, e.g., motors, and to a control unit 1500. The control unit 1500 has a CPU (not shown) and controls operation, such as image forming operation performed by the image forming unit and the operation of conveying the sheet P.

A certain time after finishing print operation, the printer 1100 transitions to a stand-by state to be ready for print operation. Further a certain time after, for reducing power consumed during standby, the printer 1100 transitions from the stand-by state to a sleeping state, which is power-saving mode. The printer 1100 has three states, namely the sleeping state, stand-by state and printing state, and the control unit

1500 causes the printer 1100 to transition among these states. When the target voltage for the switching power supply circuit 100 or 200 is to be 24 V, the control unit 1500 outputs a high-level 24VSL signal. When the target voltage for the switching power supply circuit 100 or 200 is to be 5 V, the control unit 1500 outputs a low-level 24VSL signal. Thus, while the printer 1100 is in the printing state or the stand-by state, the switching power supply circuit 100 or 200 is controlled to have an output voltage Vout of 24 V, for example. While the printer 1100 is in the sleeping state, the switching power supply circuit 100 or 200 is controlled to have an output voltage Vout of 5 V, for example. Note that image forming apparatuses to which the power supply apparatuses of the present invention is applicable are not limited to those configured as illustrated in FIG. 7.

Thus, according to the third embodiment, unnecessary current flowing into components can be reduced when the output voltage of the power supply apparatus is switched.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-231987, filed Dec. 11, 2018, which is hereby incorporated by reference herein in its entirety.

What is claimed is:

1. A power supply apparatus comprising:
a transformer including a primary winding and a secondary winding;
a first switching element connected in series with the primary winding of the transformer;
a circuit connected in parallel with the primary winding of the transformer, the circuit including a second switching element and a capacitor connected in series with each other;
a rectifying and smoothing unit configured to rectify and smooth a voltage induced in the secondary winding and output an output voltage;
a feedback unit configured to output a feedback voltage according to the output voltage;
a control unit configured to control the first switching element and the second switching element so that the output voltage becomes a target voltage based on the feedback voltage output from the feedback unit;
a notification unit configured to notify the control unit that the target voltage is switched from a first voltage to a second voltage higher than the first voltage according to a first signal being input to the notification unit; and
a switching unit configured to switch the target voltage to the first voltage or the second voltage,
wherein the switching unit switches the target voltage from the first voltage to the second voltage after the notification unit notifies the control unit that the target voltage is switched from the first voltage to the second voltage,
wherein the notification unit includes a first capacitor and a first resistor,
wherein the switching unit includes a second capacitor and a second resistor,
wherein a first time constant determined by the first capacitor and the first resistor is smaller than a second time constant determined by the second capacitor and the second resistor, and
wherein the switching unit switches the target voltage from the first voltage to the second voltage in response to the first signal being input to the switching unit and an elapse of a predetermined time determined by a difference between the first time constant and the second time constant, after the input of the first signal to the switching unit.

2. The power supply apparatus according to claim 1, wherein the control unit outputs a second signal to the switching unit after it is notified by the notification unit that the target voltage is switched from the first voltage to the second voltage, and
wherein the switching unit switches the target voltage from the first voltage to the second voltage in response to an input of the second signal.

3. The power supply apparatus according to claim 1, wherein if the control unit is notified by the notification unit that the target voltage is switched from the first voltage to the second voltage, the control unit controls ON-time of the first switching element to be gradually increased irrespective of the feedback voltage.

4. The power supply apparatus according to claim 1, wherein if the feedback voltage falls to a predetermined voltage after the notification unit notifies the control unit that the target voltage is switched from the first voltage to the second voltage, the control unit controls the first switching element and the second switching element such that the output voltage becomes the second voltage.

5. An image forming apparatus comprising:
an image forming unit configured to form an image on a recording material; and
a power supply apparatus configured to supply power to the image forming apparatus;
wherein the power supply apparatus comprises:
a transformer including a primary winding and a secondary winding;
a first switching element connected in series with the primary winding of the transformer;
a circuit connected in parallel with the primary winding of the transformer, the circuit including a second switching element and a capacitor connected in series with each other;
a rectifying and smoothing unit configured to rectify and smooth a voltage induced in the secondary winding and output an output voltage;
a feedback unit configured to output a feedback voltage according to the output voltage;
a control unit configured to control the first switching element and the second switching element so that that the output voltage becomes a target voltage based on the feedback voltage output from the feedback unit;
a notification unit configured to notify the control unit that the target voltage is switched from a first voltage to a second voltage higher than the first voltage according to a first signal being input to the notification unit; and
a switching unit configured to switch the target voltage to the first voltage or the second voltage,
wherein the switching unit switches the target voltage from the first voltage to the second voltage after the notification unit notifies the control unit that the target voltage is switched from the first voltage to the second voltage,
wherein the notification unit includes a first capacitor and a first resistor,
wherein the switching unit includes a second transistor, a second capacitor and a second resistor, wherein a first time constant determined by the first capacitor and the first resistor is smaller than a second time constant determined by the second capacitor and the second resistor, and wherein the switching unit switches the target voltage from the first voltage to the second voltage in response to the first signal being input to the switching unit and an elapse of a predetermined time determined by a difference between the first time constant the second time constant, after the input of the first signal to the switching unit.

6. The image forming apparatus according to claim 5, further comprising an apparatus control unit configured to control the image forming apparatus and the power supply apparatus, wherein the image forming apparatus has operation states of a printing state in which the image is formed, a stand-by state in which less power is consumed than in the printing state, and a sleeping state in which less power is consumed than in the stand-by state, and wherein the apparatus control unit outputs the first signal to the notification unit and the switching unit that causes the target voltage to be the first voltage to the power supply apparatus in the sleeping state, and outputs the first signal to the notification unit and the switching unit that causes the target voltage to be the second voltage to the power supply apparatus in the printing state and the stand-by state.

* * * * *